United States Patent [19]
Kaji et al.

[11] 3,909,804
[45] Sept. 30, 1975

[54] METHOD OF DRIVING A MATRIX PANEL WITH ONLY TWO TYPES OF PULSES

[75] Inventors: Tetsunori Kaji, Kokubunji; Masashi Mizushima, Hachioji, both of Japan

[73] Assignee: Hitachi, Ltd., Japan

[22] Filed: Feb. 22, 1974

[21] Appl. No.: 444,743

[30] Foreign Application Priority Data

Feb. 26, 1973 Japan .............................. 48-22066

[52] U.S. Cl.... 340/173 PL; 315/169 R; 340/324 M
[51] Int. Cl.$^2$ .................... G11C 7/00; G11C 11/28
[58] Field of Search ..... 340/173 PL, 324 R, 324 M; 315/169 TV, 169 R

[56] References Cited

UNITED STATES PATENTS

| | | | |
|---|---|---|---|
| 3,559,190 | 1/1971 | Bitzer et al. | 340/173 PL |
| 3,739,371 | 6/1973 | Hulyer | 340/173 PL |
| 3,761,897 | 9/1973 | Tech | 340/173 PL |
| 3,811,124 | 5/1974 | Kleen et al. | 340/173 PL |

*Primary Examiner*—Stuart N. Hecker
*Attorney, Agent, or Firm*—Craig & Antonelli

[57] ABSTRACT

A method of driving a matrix panel composed of photo elements connected to the intersections of lateral and longitudinal electrodes in which, when one of the photo elements is addressed, a firing trigger pulse is applied to the lateral electrode to which the specific photo element is connected, and an erasing trigger pulse is applied to the corresponding longitudinal line for placing the specific photo element in the erased state.

10 Claims, 27 Drawing Figures

METHOD OF DRIVING A MATRIX PANEL WITH ONLY TWO TYPES OF PULSES

BACKGROUND OF THE INVENTION

1. FIELD OF THE INVENTION

This invention relates to a method of driving a display panel composed of a plurality of photo elements having an information storing function.

2. DESCRIPTION OF THE PRIOR ART

An attempt has been made in which a plurality of photo elements having an information storing function are arranged in the form of a matrix to constitute a matrix panel and this matrix panel is utilized for the display of a televised picture. However, this attempt has had such a defect that a prolonged addressing time is required when the existing displaying method is resorted to for triggering the matrix panel.

SUMMARY OF THE INVENTION

It is an object of the present invention to provide a novel and useful method of driving a matrix display panel composed of a plurality of photo elements having an information storing function so as to reduce the addressing time required for sequential scanning of lines.

Another object of the present invention is to provide a simplified method of driving such a display panel while ensuring stable operation.

According to the present invention which attains the above objects, firing pulses (or erasing pulses) are applied to lateral lines only of such a matrix panel as trigger pulses for such lines, while erasing pulses (or firing pulses) are applied to longitudinal lines only of the matrix panel as trigger pulses for such lines.

The present invention will now be described in detail with reference to the accompanying drawings while comparing same with a prior art method.

DESCRIPTION OF THE PREFERRED EMBODIMENTS

Figure 1A:
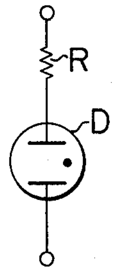
FIGS. 1*a* to 1*e* show various forms of photo elements which can be employed in the present invention.
Figure 1B:
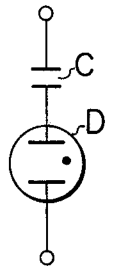
Figure 1C:
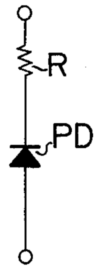
Figure 1D:
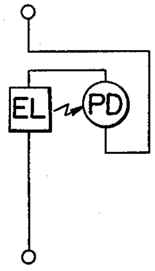
Figure 1E:
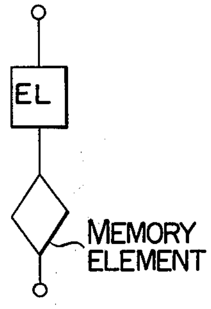

FIGS. 1*a* to 1*e* show various forms of photo elements having an information storing function. Referring to FIG. 1*a*, a discharge tube D is connected in series with a resistor R. In FIG. 1*b*, a discharge tube D is connected in series with a capacitor C. In FIG. 1*c*, a photo diode PD having a negative resistance region is connected in series with a resistor R. In FIG. 1*d*, a light emitting element such as an electro luminescence element EL (or a light emitting diode) is connected in series with a light receiving element such as a photo diode PD (or a photo transistor). In FIG. 1*e*, an electro luminescence element EL is connected in series with a memory element. The elements shown in FIG. 1*e* may be connected in parallel with each other.

The photo element having such an information storing function is in no way limited to the light emitting element and may be a light modulating element. For example, a liquid crystal element having an information storing function can be also employed in the present invention.

In the following description, however, the light emitting element will be principally referred to for the simplicity of explanation.

Figure 2:
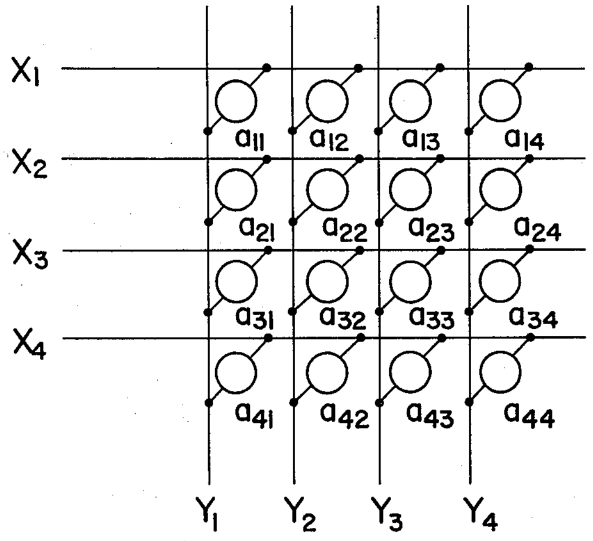
FIG. 2 is a diagrammatic view showing the arrangement of photo elements constituting a matrix panel.

FIG. 2 is a diagrammatic view showing the structure of a matrix panel composed of a plurality of photo elements as above described. In FIG. 2, the symbols $X_1$, $X_2$, $X_3$, $X_4$ and $Y_1$, $Y_2$, $Y_3$, $Y_4$ designate lateral lines and longitudinal electrodes providing the longitudinal lines respectively. Photo elements $a_{11}$ to $a_{44}$ are connected to these lateral and longitudinal electrodes at the intersections of these electrodes.

Figure 3:
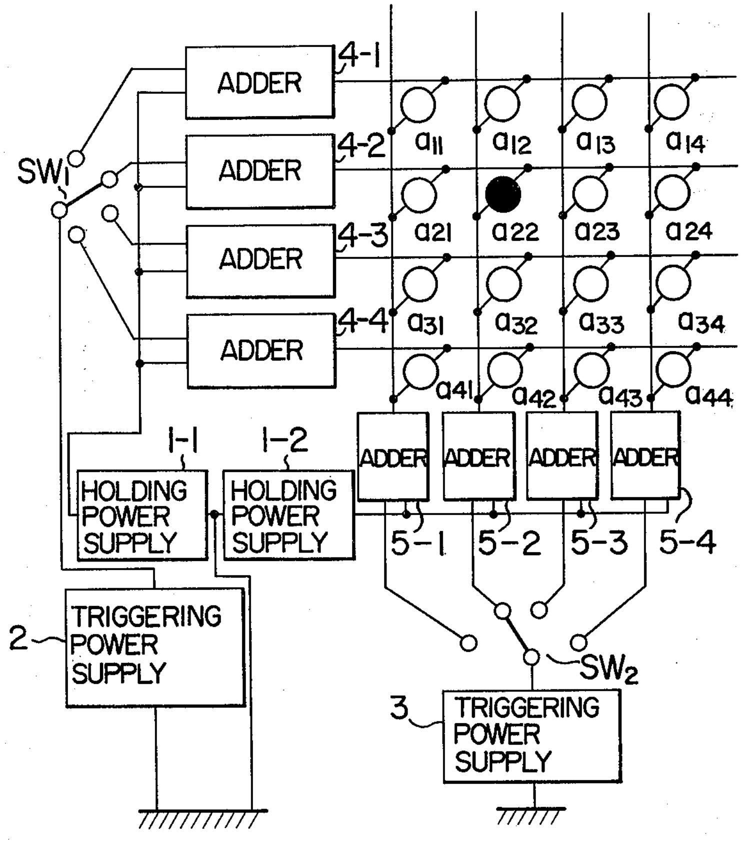
FIG. 3 PRIOR ART
FIG. 3 is a block diagram showing the structure of a prior art matrix panel driving system.

FIG. 3 is a block diagram of a system commonly conventionally used for driving the panel shown in FIG. 2 for displaying a picture on the panel. Referring to FIG. 3, a lateral line holding power supply 1 — 1 and a longitudinal line holding power supply 1 – 2 are provided for holding the state of the photo elements $a_{11}$ to $a_{44}$ in these lines. A lateral line triggering power supply 2 and a longitudinal line triggering power supply 3 are provided for causing a change in the state of these photo elements $a_{11}$ to $a_{44}$. A lateral line selecting switch $SW_1$ and a longitudinal line selecting switch $SW_2$ are provided for selecting the photo element or elements to which the trigger signals are to be applied. These switches $SW_1$ and $SW_2$ are shown in a position in which the photo element $a_{22}$ is addressed. Adders 4-1, 4-2, 4-3 and 4-4 provide the sum of the input signals applied to the lateral lines, and adders 5-1, 5-2, 5-3 and 5-4 provide the sum of the input signals applied to the longitudinal lines.

In the prior art driving system shown in FIG. 3, a period of time, which is the product of the number of the photo elements and the period of time $t_1$ required for causing a change in the state of one photo element, is required for changing the state of all the photo elements by means of dot sequential scanning. The period of time $t_1$ required for causing a change in the state of a photo element having an information storing function is generally greater than 10 μsec. Thus, the period of time required for scanning a panel composed of 500 ×

500 = 250000 photo elements is greater than 250000 $\times t_1 = 2.5$ sec. which is a quite long period of time.

Figure 4:
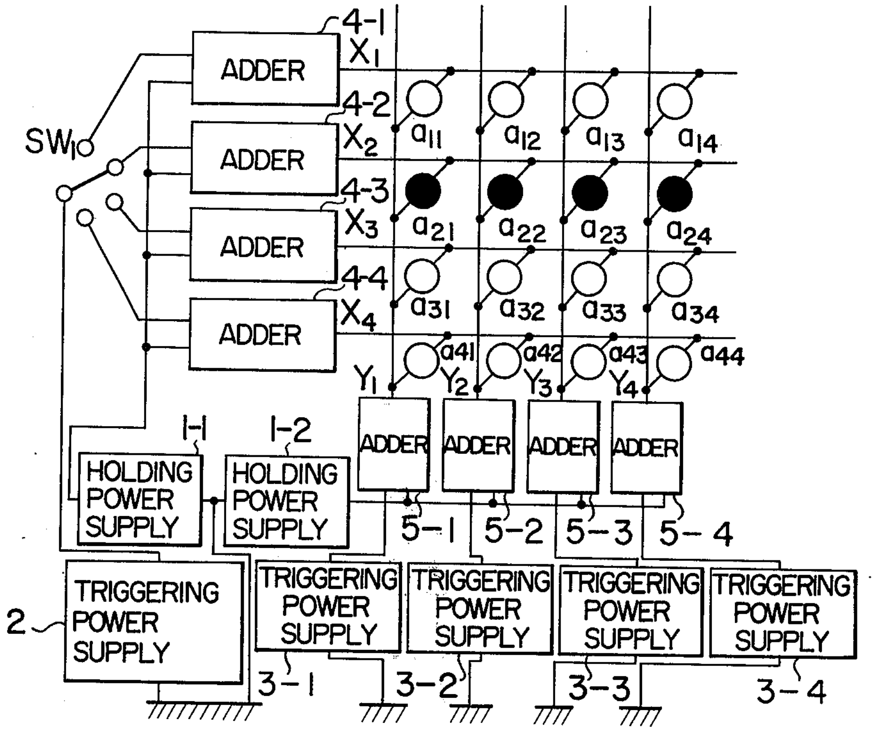
FIG. 4 is a block diagram showing the structure of an improved matrix panel driving system to which the present invention is applied so as to carry out line sequential scanning.

A driving system as shown in FIG. 4 has been proposed in an effort to shorten the period of time required for scanning. The driving system shown in FIG. 4 is adapted to scan a panel by means of line sequential scanning. In FIG. 4, like reference numerals are used to denote like parts appearing in FIG. 3. Longitudinal line triggering power supplies 3-1 to 3-4 are connected to respective adders 5-1 to 5-4. FIG. 4 represents the case in which photo elements $a_{21}$, $a_{22}$, $a_{23}$ and $a_{24}$ are addressed simultaneously. This improved driving system shown in FIG. 4 is advantageous in that the period of time required for scanning a panel composed of, for example, $500 \times 500 = 250000$ photo elements can be reduced to $500 \times t_1$ μsec. However, the value of $t_1$ is not so small as expected depending on the properties of the photo elements, and therefore, the value of $500 \times t_1$ μsec. is frequently excessively large in practical use. The manner of driving shown in FIG. 4 has also been defective in that a large number of triggering power supplies is required resulting in complexity of the system.

Figure 5A:
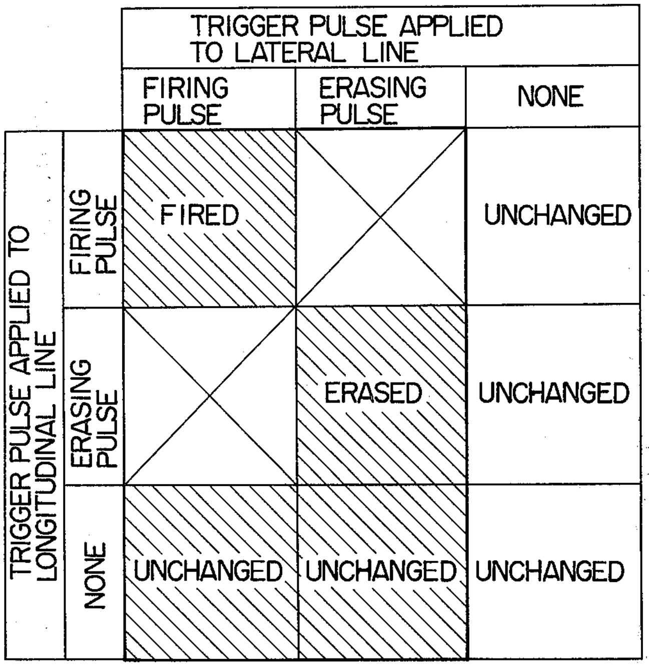
FIG. 5a PRIOR ART
FIGS. 5*a*, 5*b* and 5*c* show manners of applying trigger pulses to the matrix panel shown in FIG. 4.

FIG. 5a shows a prior art manner of addressing the photo elements by applying firing and erasing pulses thereto by the driving system shown in FIG. 4. Trigger pulses applied to the lateral lines and longitudinal lines firing pulses and erasing pulses, and there is also a case in which no trigger pulses are applied to these lines. Due to the combination of these cases, the photo elements take various states as seen in FIG. 5a. In FIG. 5a, the domains shown by X do not occur due to the fact that the firing and erasing pulses are out of phase. The hatched portions represent the addressed domains.

Therefore, in order to attain the prior art manner of addressing as shown in FIG. 5a, the lateral line and longitudinal line triggering power supplies must apply two kinds of trigger pulses or firing and erasing pulses to these lines resulting in complexity of the system. Further, the prior art manner of addressing shown in FIG. 5a is defective in that the period of time required for addressing one of the lines is the sum of the period required for firing and the period of time required for erasing and is considerably long due to the fact that the firing pulses and erasing pulses are applied with different timing.

Figure 6:
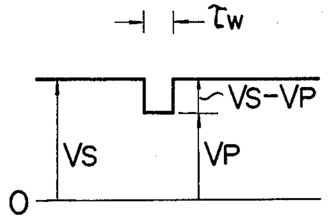
FIGS. 6 and 11 show waveforms of trigger pulses preferably used in the present invention.
Figure 7:
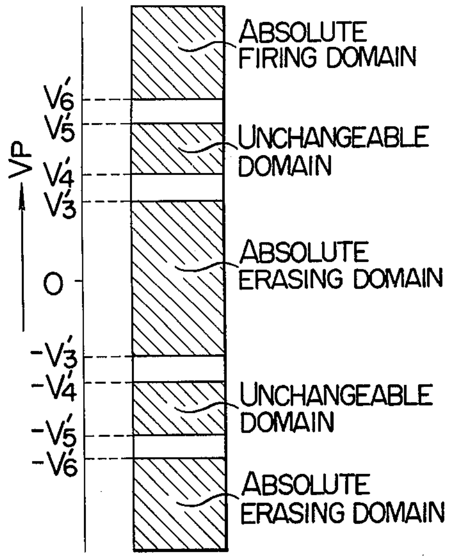
FIGS. 7 and 12 show variations in the state of the photo element in the panel in response to the application of the trigger pulse waveforms shown in FIGS. 6 and 11 respectively.

Generally, a photo element holds one of two states, that is, a fired state and an erased state. When a holding voltge (or holding current) for holding such a photo element in the fired or erased state is applied thereto in superposed relation with a trigger pulse (a firing pulse or erasing pulse), the photo element is placed in one of an uncertain domain, an unchangeable domain, an absolute firing domain and an absolute erasing domain. FIG. 7 shows the change occuring in the state of the photo element when a voltage having a waveform as shown in FIG. 6 is applied thereto. In FIG. 6, $V_S$ represents the holding voltage having an amplitude $V_S$ for holding the photo element in the fired or erased state. When a trigger pulse having a pulse width $\tau_w$ and a pulse voltage of $(V_S - V_P)$ is applied to the photo element in superposed relation with the holding voltage $V_S$, the magnitude of the voltage $V_P$ is varied depending on whether the trigger pulse is the firing pulse or the erasing pulse, and the state of the photo element is changed in a manner as shown in FIG. 7. In FIG. 7, the domain in which the voltage $V_P$ lies within the ranges of $|V_3'| < |V_P| < |V_4'|$ and $|V_5'| < |V_P| < |V_6'|$ is the uncertain domain. In this domain, the state of the photo element is uncertain due to fluctuations in the properties thereof and depends on the state existed before the application of the trigger pulse. In the domain in which the voltage $V_P$ lies within the range of $|V_4'| < |V_P| < |V_5'|$ is the unchangeable domain, and in this domain, no change occurs in the state of the photo element in spite of the application of the trigger pulse. The holding voltage $V_S$ is selected to produce this unchangeable domain. The domain in which the voltage $V_P$ lies within the range of $|V_6'| < |V_P|$ is the absolute firing domain, and in this domain, the photo element is placed in the fired state after the application of the trigger pulse irrespective of whether the photo element has been in the fired state or in the erased state before the application of the trigger pulse. The domain in which the voltage $V_P$ lies within the range of $|V_P| < |V_3'|$ is the absolute erasing domain, and in this domain, the photo element is placed in the erased state after the application of the trigger pulse irrespective of whether the photo element has been in the fired state or in the erased state before the application of the trigger pulse.

Figure 8A:
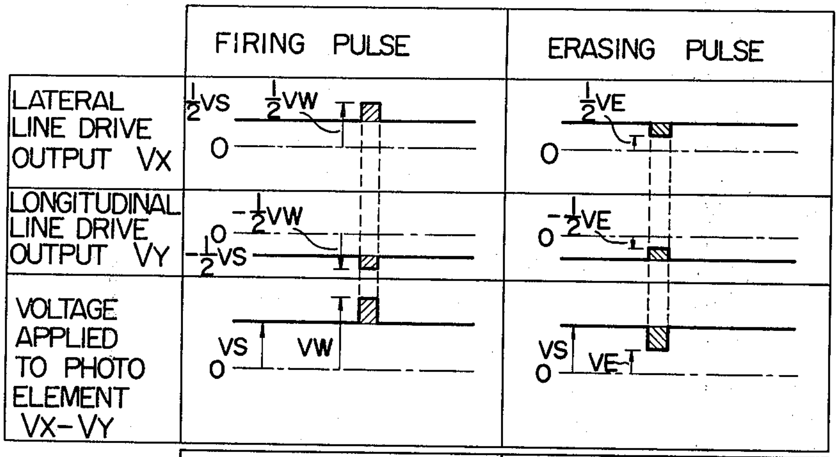
FIG. 8a PRIOR ART
FIGS. 8*a* and 9 show waveforms of prior art trigger pulses applied to the lateral and longitudinal lines of the panel.

FIG. 8a shows waveforms of trigger pulses priorly used in the driving system shown in FIG. 4 for changing the state of photo elements which have domains as described with reference to FIG. 7 and are arranged in the form of a matrix as shown in FIG. 2. When it is desired to place one of the photo elements in the fired state, a voltage $V_X$ obtained by superposing a firing pulse voltage having a level of $\frac{1}{2}(V_W - V_S)$ on a voltage $\frac{1}{2}V_S$ having the half level of the holding voltage $V_S$ is applied to the lateral electrode to which the desired photo element is connected, while a voltage $V_Y$ obtained by superposing a firing pulse voltage having a level of $-\frac{1}{2}(V_W - V_S)$ on a voltage $-\frac{1}{2}V_S$ having the half level of the holding voltage $V_S$ is applied to the longitudinal electrode to which the desired photo element is connected. As a result, a voltage $V_X - V_Y$ which is the combination of the holding voltage $V_S$ and the pulse voltage $(V_W - V_S)$ is applied to the desired photo element. It is apparent from FIG. 7 that the desired photo element is placed in the state of absolute firing when the level of the voltage $V_W$ is selected to lie within the range of $|V_W| > |V_6'|$, and the remaining photo elements are placed in the unchangeable state when the voltage $\frac{1}{2}(V_S + V_W)$ is selected to lie within the range of $|V_4'| < |\frac{1}{2}(V_W + V_S)| < |V_5'|$.

When it is desired to place one of the photo elements in the erased state, a voltage $V_X$ obtained by superposing an erasing pulse voltage having a level of $\frac{1}{2}(V_E - v_S)$ on a voltage $\frac{1}{2}V_S$ having the half level of the holding voltage $V_S$ is applied to the lateral electrode to which the desired photo element is connected, while a voltage $V_Y$ obtained by superposing an erasing pulse voltage having a level of $-\frac{1}{2}(V_E - V_S)$ on a voltage $-\frac{1}{2}V_S$ having the half level of the holding voltage $V_S$ is applied to the longitudinal electrode to which the desired photo element is connected. As a result, a voltage $V_X - V_Y$ which is the combination of the holding voltage $V_S$ and the pulse voltage $(V_E - V_S)$ is applied to the desired photo element. It is apparent from FIG. 7 that the desired photo element is placed in the state of absolute erasing when the voltage $V_E$ is selected to lie within the range of $|V_E| < |V_3'|$ and the remaining photo elements are placed in the unchangeable state when the voltage ½ $(V_S + V_E)$ is selected to lie within the range of $|V_4'| < |½ (V_S + V_E)| < |V_5'|$.

Figure 9:
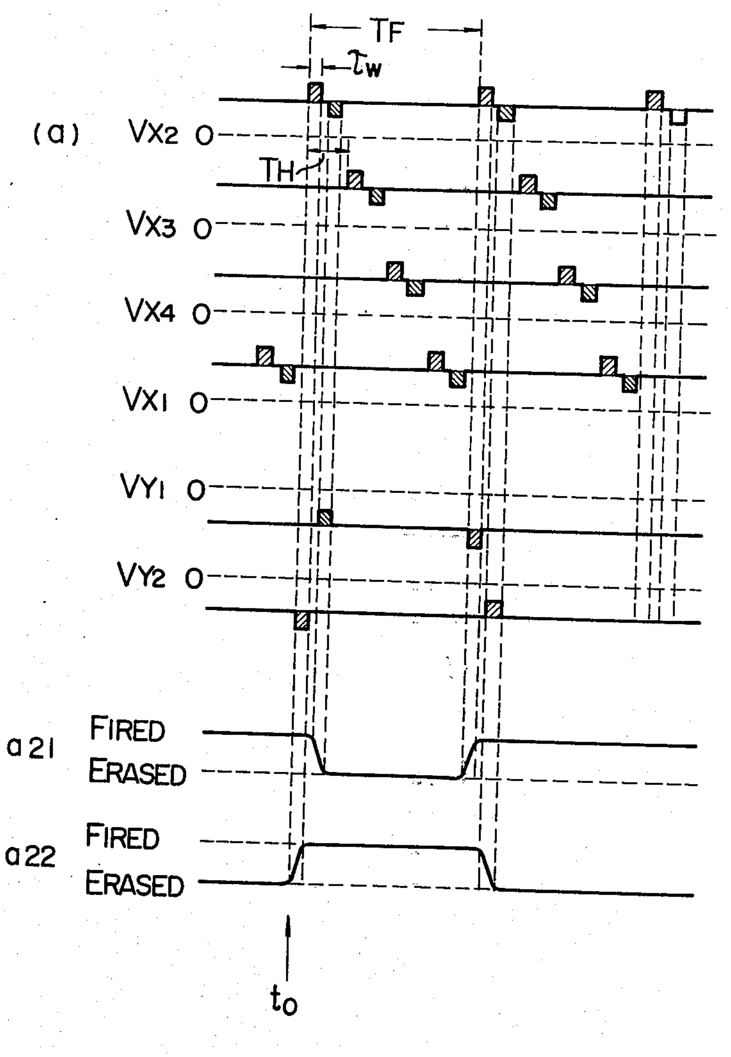
FIG. 9 PRIOR ART

FIG. 9 shows the manner of line sequential scanning by the driving system shown in FIG. 4 by the use of trigger pulses as shown in FIG. 8a. In the prior art manner of line sequential scanning shown in FIG. 9, pulse waveforms $V_{X1}$, $V_{X2}$, $V_{X3}$, $V_{X4}$, $V_{Y1}$, and $V_{Y2}$, are applied to the respective electrodes $X_1$, $X_2$, $X_3$, $X_4$, $Y_1$ and $Y_2$ in the panel shown in FIG. 2. Suppose that the photo elements $a_{21}$ and $a_{22}$ are in the fired state and in the erased state respectively at time $t < t_o$ in FIG. 9. Referring to FIG. 9, the pulse waveform $V_{Y1}$ is applied to the electrode $Y_1$ so that the photo element $a_{21}$ can be placed in the erased state at time $t > t_o$ and then be placed in the fired state again after a period of time $T_F$ corresponding to one frame. The pulse waveform $V_{Y2}$ is applied to the electrode $Y_2$ so that the photo element $a_{22}$ can be placed in the fired state at time $t > t_o$ and can then be placed in the erased state again after one frame period. In FIG. 9, $T_H$ represents one horizontal scanning period.

However, such a prior art method of addressing the photo elements by trigger pulses as shown in FIG. 8a has the following defects:

1. Two trigger signals (firing pulses and erasing pulses) having different amplitudes must be applied to the electrodes, and this results in a complex circuit.

2. In order that the system can operate satisfactorily without any mal-operation, severe restrictions are imposed on the level of the pulse voltages $V_W$ and $V_E$. When, for example, the matrix panel is composed of 10 × 10 photo elements, the following values are required:

$V_3 = 148$ volts, $V_4 = 156$ volts, $V_5 = 187$ volts, $V_6 = 198$ volts, $\tau_w = 20$ μsec.

The values of $V_W$ and $V_E$ are limited to within the following ranges when the holding voltage $V_S = (V_4 + V_5)/2 = 171.5$ volts:

$$148 \text{ volts} = V_3\ V_E > ½ (2V_4 - V_S) = 140.5 \text{ volts},$$

$$202.5 \text{ volts} = ½ (2V_5 - V_S) > V_W > V_6 = 198 \text{ volts}$$

It will be seen from the above that $V_E$ and $V_W$ have a narrow allowable range. With the increase in the number of the photo elements in the panel, the uncertain domain increases correspondingly resulting in a reduction of $V_3$ and $V_5$ and in an increase of $V_4$ and $V_6$. Thus, the allowable range of $V_E$ and $V_W$ becomes narrower until finally some of the photo elements cannot be addressed.

3. The erasing and firing trigger pulses applied to the photo elements have a voltage value representative of the difference between the voltage values of the trigger pulses applied to the lateral lines and the trigger pulses applied to the longitudinal lines. Thus, the errors of the individual trigger pulses are accumulated, and high precision is required for the triggering power supplies in order to eliminate such errors.

4. When line sequential scanning is carried out by the system shown in FIG. 4, the period of time $T_H$ required for scanning one line is the sum of the firing period of time and the erasing period of time since the photo elements connected to the same line include those which should be placed in the fired state and those which should be placed in the erased state. For example, $T_H$ is more than $2\tau_w$ required for the erasing or firing trigger pulses.

It will be understood from the above description that, in the prior art manner of addressing of the photo elements described with reference to FIG. 8a and 9, firing pulses and erasing pulses are applied to selected ones of the lateral lines, and at the same time, firing pulses and erasing pulses are selectively applied to the longitudinal lines or no trigger pulses are applied to the longitudinal lines at all so as to establish the state of absolute firing, the state of absolute erasing and the unchangeable state.

Therefore, in the case in which the photo elements, for example, the photo elements $a_{21}$, $a_{22}$, $a_{23}$ and $a_{24}$ connected to the electrode $X_2$ have been addressed by line sequential scanning and the states in which all these photo elements should be placed have been already known, the signals for establishing the state of absolute firing and the state of absolute erasing may be applied to the longitudinal lines and the signal for establishing the unchangeable state is unnecessary. The defects involved in the prior art manner of addressing above described can thus be obviated by eliminating the unchangeable state of the addressed photo elements.

According to the present invention which obviates the prior art defects, trigger pulse of one kind are applied to the lateral lines or longitudinal lines while trigger pulses of another kind are applied to the longitudinal lines or lateral lines, although two kinds of trigger pulses, that is, firing pulses and erasing pulses are applied to the lateral lines or longitudinal lines in the prior art method.

Figure 5B:
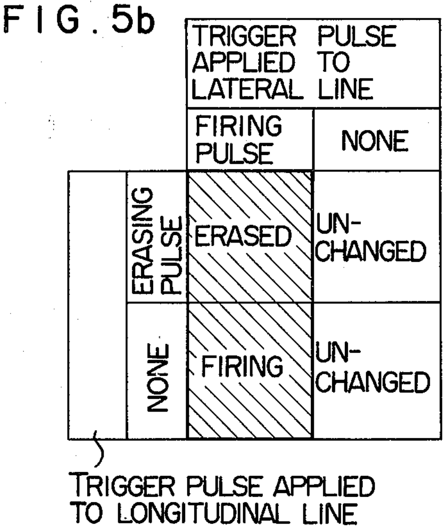
Figure 5C:
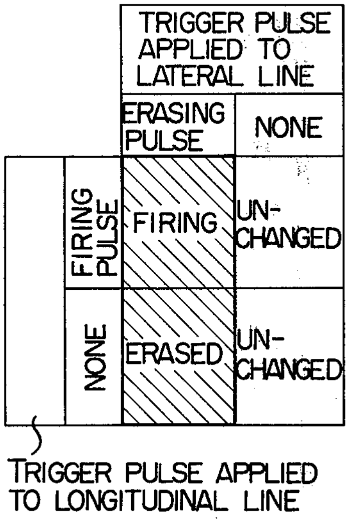

More precisely, the present invention employs a manner of addressing as shown in FIGS. 5b and 5c. As will be seen from FIGS. 5b and 5c, firing pulses or erasing pulses only are applied to the lateral lines, while erasing pulses or firing pulses only are applied to the longitudinal lines or lateral lines to place the photo elements in the fired state and erased state, so as to eliminate the unchangeable state of the addressed photo elements. In the case of FIG. 5b, firing trigger pulses are applied to the lateral lines, while erasing trigger pulses are applied to the longitudinal lines. In the case of FIG. 5c, erasing trigger pulses are applied to the lateral lines, while firing trigger pulses are applied to the longitudinal lines.

Figure 8B:
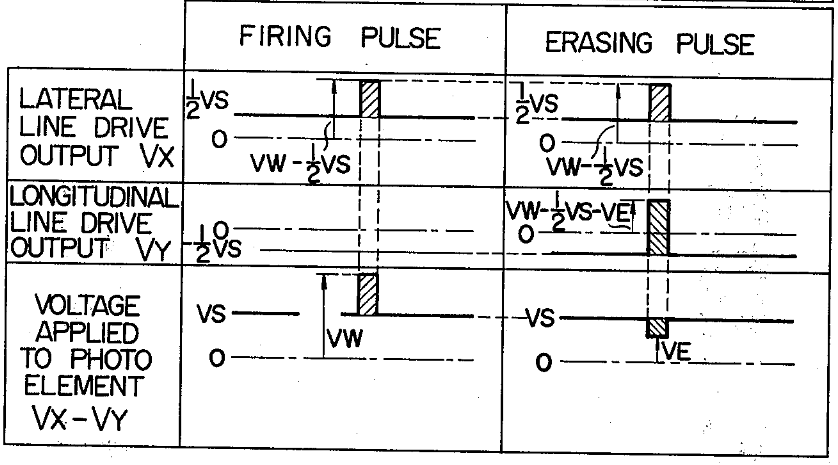
FIG. 8*b* and 10 show waveforms of trigger pulses of the present invention applied to the lateral and longitudinal lines of the panel.

FIG. 8b shows waveforms of firing pulses and erasing pulses employed in the present invention, and like symbols are used therein to denote like pulses and their levels shown in FIG. 8a. When one of the photo elements in one of the lateral lines is addressed, a voltage ½ $V_S$ which is the half level of the holding voltage $V_S$ and a firing trigger pulse having a pulse voltage $(V_W - V_S)$ are applied in superposed relation to the specific lateral line as shown in FIG. 8b in both the case in which it is desired to place the addressed photo element in the energized or fired state and the case in which it is desired to place the addressed photo element in the deenergized or erased state. On the other hand, no firing trigger pulse is applied to the corresponding longitudinal line when it is desired to place the addressed photo element in the fired state, while a voltage —½ $V_S$ which is the half level of the holding voltage $V_S$ and an erasing pulse having a pulse voltage $(V_W - V_E)$ are applied in superposed relation to the specific longitudinal line when it is desired to place the addressed photo element in the erased state. The line sequential scanning can be carried out without any mal-operation of the system when the voltages $V_W$, $V_E$ and $V_S$ are selected to satisfy the relations $|V_W| > |V_6'|$, $|V_E| < |V_3'|$, and $|V_4'| < |V_W - V_E - V_S| < |V_5'|$. These conditions are far less severe compared with the prior art restrictions imposed on $V_W$ and $V_E$.

For example, the allowable values of $V_W$ and $V_E$ are as follows when the trigger pulses of the present invention shown in FIG. 8b are used to drive a panel composed of 10 × 10 photo elements:

148 volts $= V_3 > V_E >$ 140 volts, and 206 volts $> V_W > V_6 =$ 198 volts when $V_S = (V_4 + V_5)/2 =$ 171.5 volts.

148 volts $= V_3 > V_E >$ 132.5 volts, and 213.5 volts $> V_W >$ 198 volts when $V_S = V_4 =$ 156 volts.

It will be seen that, when $V_S$ is selected to be equal to $V_4$, the allowable range of $V_E$ and $V_W$ can be greatly enlarged and stable operation can be ensured.

Further, the structure of the driving system can be greatly simplified according to the method of the present invention due to the fact that trigger pulses of only one kind are applied to the lateral lines or longitudinal lines, whereas trigger pulses of two kinds are applied to the lateral lines or longitudinal lines in the prior art method. Further, the period of time $T_H$ required for scanning one line can be reduced to about one-half of the period priorly required. Furthermore, due to the fact that firing trigger pulses need not be applied to the longitudinal lines, less errors occur compared with the prior art method in which firing trigger pulses are applied to both the lateral lines and the longitudinal lines.

Figure 10:
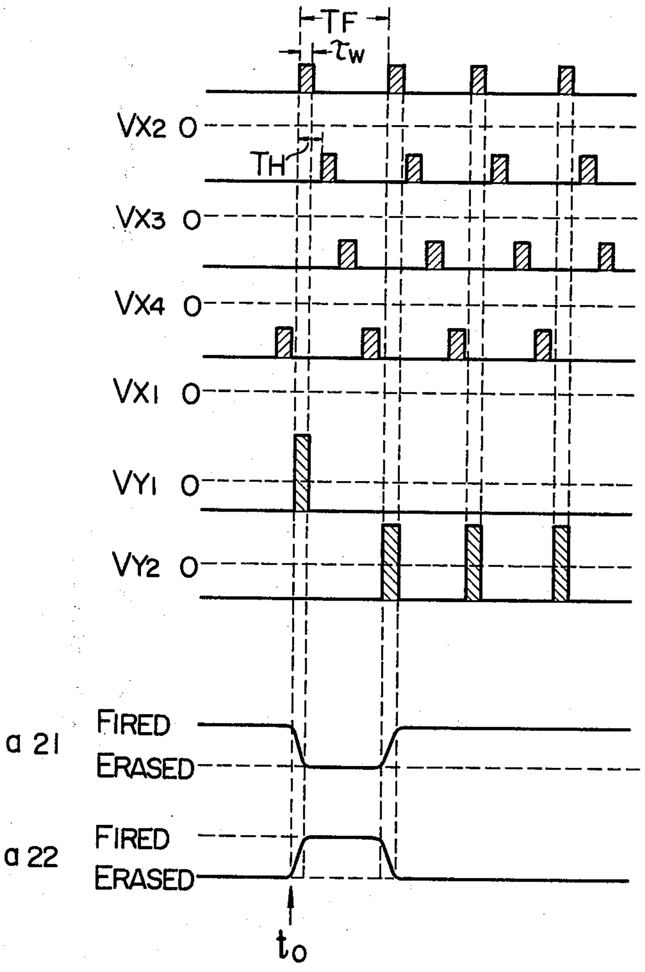

FIG. 10 shows waveforms applied to the lateral and longitudinal electrodes when line sequential scanning is carried out by the driving system shown in FIG. 4 according to the method of the present invention, so that such waveforms can be compared with those shown in FIG. 9 in which line sequential scanning is carried out according to the prior art method.

Suppose that the photo elements $a_{21}$ and $a_{22}$ are in the fired state and in the erased state respectively at time $t < t_o$ in FIG. 10. Referring to FIG. 10, a pulse waveform $V_{Y1}$ is applied to the electrode $Y_1$ so that the photo element $a_{21}$ can be placed in the erased state at time $t > t_o$ and can then be placed in the first state again after a period of time $T_F$ corresponding to one frame. A pulse waveform $V_{Y2}$ is applied to the electrode $Y_2$ so that the photo element $a_{22}$ can be placed in the fired state at time $t > t_o$ and can then be placed in the erased state again after one frame period.

According to the method of line sequential scanning using trigger pulse waveforms as shown in FIG. 10, a firing trigger pulse waveform $V_{X2}$ having a pulse width $\tau_w$ is applied to the lateral electrode $X_2$ and an erasing trigger pulse waveform $V_{Y1}$ is applied to the longitudinal electrode $Y_1$ to place the photo element $a_{21}$ in the erased state, while no trigger pulse is applied to the longitudinal electrode $Y_2$ to place the photo element $a_{22}$ in the fired state. After one frame period $T_F$, an erasing trigger pulse waveform $V_{Y2}$ is applied to the longitudinal electrode $Y_2$ to place the photo element $a_{22}$ in the erased state, while no trigger pulse is applied to the longitudinal electrode $Y_1$ to place the photo element $a_{21}$ in the fired state.

In the pulse waveforms $V_{Y1}$ and $V_{Y2}$ shown in FIGS. 9 and 10, the trigger pulses for addressing the photo elements except the photo elements $a_{21}$ and $a_{22}$ are eliminated for simplicity of explanation. the same applies to the description which follows. FIG. 10 represents the case in which the firing signal is applied to the lateral lines and the erasing signal is applied to the longitudinal lines. However, it will be apparent to those skilled in the art that the firing signal and erasing signal may be applied to the longitudinal lines and lateral lines respectively.

It will be understood from the above description that, according to the present invention, a firing pulse having a pulse width $\tau_w$ is applied to the desired lateral line including the desired photo element and an erasing pulse is applied to the corresponding longitudinal line to place the desired photo element in the erased state, while when no trigger pulse is applied to the corresponding longitudinal line the desired photo element is placed in the fired state. Thus, when the firing trigger pulse and erasing trigger pulse have the same pulse width $\tau_w$, the specific photo element can be simultaneously addressed for firing and erasing during the period of time of the pulse width $\tau_w$ of the firing pulse. Therefore, the period of time $T_H$ (shown in FIG. 10) required for scanning one line can be reduced to a value of the order of the duration $\tau_w$ of the firing pulse, that is , such period can be reduced to about one-half of the period priorly required. The present invention is therefore advantageous in that the required addressing time is reduced to about one-half of the prior art value, the structure of the trigger circuit can be greatly simplified, and the system can operate stably by virtue of the increase in the operating margin of the trigger pulses.

The present invention will next be described with reference to driving of a plasma matrix panel composed of a plurality of plasma elements each of which is represented by an equivalent circuit as shown in FIG. 1b.

Figure 11:
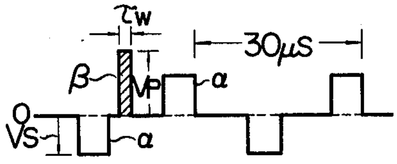
Figure 12:
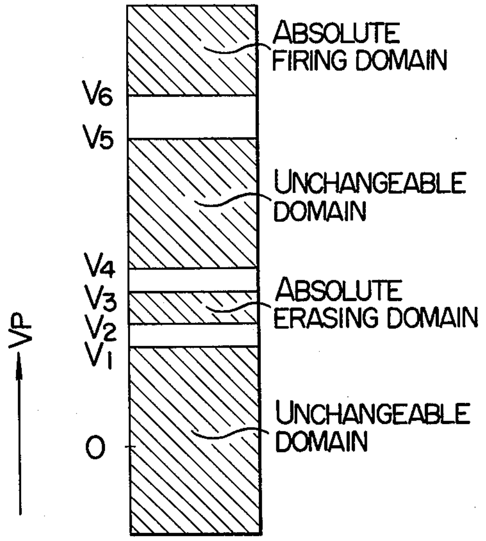

A holding voltage signal $\alpha$ has an amplitude $V_S$ and consists of a train of pulses which are positive and negative relative to the zero potential line as shown in FIG. 11. FIG. 12 shows changes occurring in the state of such a plasma element when a trigger pulse voltage signal $\beta$ having a pulse width $\tau_W$ and an amplitude $V_P$ is superposed on a predetermined phase portion of this holding voltage signal $\alpha$.

More precisely, FIG. 12 shows various domains of the plasma element when the amplitude $V_P$ of the pulse voltage signal $\beta$ is varied to a plurality of values $V_1$ to $V_6$ as shown. It will be seen from FIG. 12 that the absolute erasing domain of the plasma element is relatively narrower than that of other photo elements. The individual domains shown in FIG. 12 are obtained when, for example, the pulse width $\tau_w$ of the pulse voltage signal $\beta$ is set at $\tau_w = 5$ μsec. and the amplitude $V_P$ is varied to $V_1 = 50$ volts, $V_2 = 85$ volts, $V_3 = 90$ volts, $V_4 = 110$ volts, $V_5 = 180$ volts, and $V_6 = 230$ volts.

Therefore, the absolute erasing domain of the plasma elements forming the matrix panel is considerably narrow in many cases. Thus, in the application of the present invention to such a matrix panel, an erasing trigger pulse is applied to the desired lateral line during addressing of the desired plasma element so that this pulse can be applied to the desired plasma element as an erasing signal therefor.

Figure 13A:
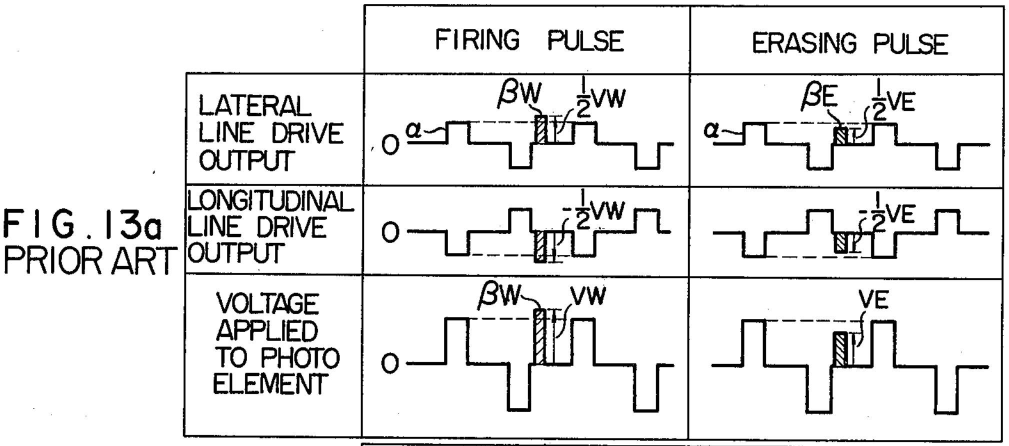
FIG. 13a PRIOR ART
FIGS. 13*a* and 14 show other waveforms of prior art trigger pulses.
Figure 13B:
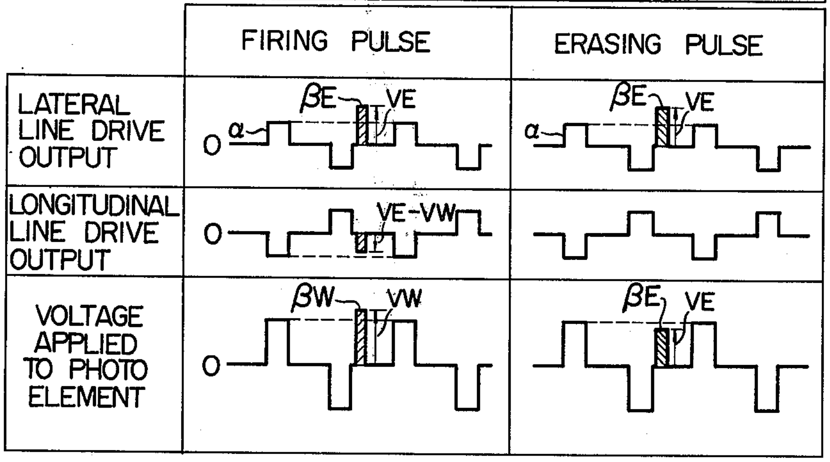
FIGS. 13*b* and 15 show other waveforms of trigger pulses used in the present invention.

Trigger pulses to be applied to the individual lines of the matrix panel composed of the plasma elements for driving same according to the method of the present invention will be described with reference to FIG. 13b while comparing such pulses with trigger pulses employed in a prior art method as shown in FIG. 13a. Referring to FIG. 13a showing trigger pulse waveforms employed in the prior art method, two firing pulses $\beta_w$ having respective amplitudes ½ $V_W$ and −½ $V_W$ are applied to the lateral line and longitudinal line corresponding to the desired plasma element, and thus, a pulse voltage having an amplitude $V_W$ representing the difference between these two firing pulses $\beta_w$ is applied to the desired plasma element for placing same in the fired state, while two erasing pulses $\beta_E$ having respective amplitudes ½ $V_E$ and —½ $V_E$ are applied to the lateral line and longitudinal line corresponding to the desired plasma element, and thus, a pulse voltage having an amplitude $V_E$ representing the difference between these two erasing pulses $\beta_E$ is applied to the desired plasma element for placing same in the erased state. Referring to FIG. 13*b* showing pulse waveforms employed in the method of the present invention, an erasing trigger pulse $\beta_E$ having an amplitude $V_E$ is applied to the lateral line corresponding to the desired plasma element during addressing of this plasma element, and a firing pulse $\beta_w$ having an amplitude $(-V_W+V_E)$ is applied to the corresponding longitudinal line when it is desired to place the addressed plasma element in the fired state, while when it is desired to place this plasma element in the erased state, no trigger pulse is applied to this longitudinal line and the erasing pulse $\beta_E$ applied to the lateral line is used directly as an erasing signal for this plasma element. In FIGS. 13*a* and 13*b*, actual values of $V_E$ and $(V_W - V_E)$ are selected so that, for example, the relations 85 volts $< V_E <$ 90 volts and 135 volts $< (V_W - V_E) <$ 180 volts are satisfied.

Figure 14:
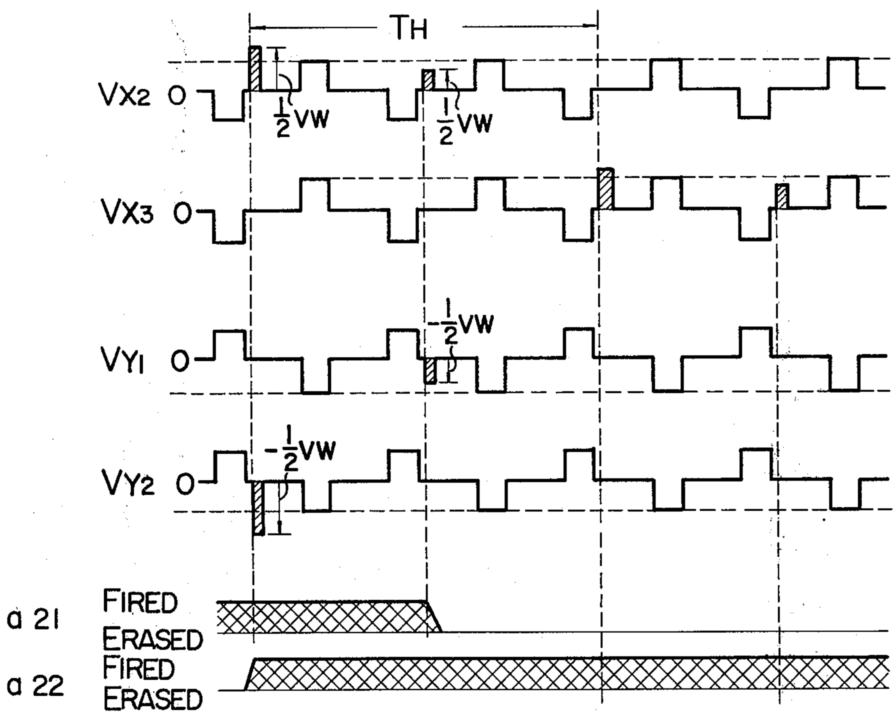
FIG. 14 PRIOR ART
Figure 15:
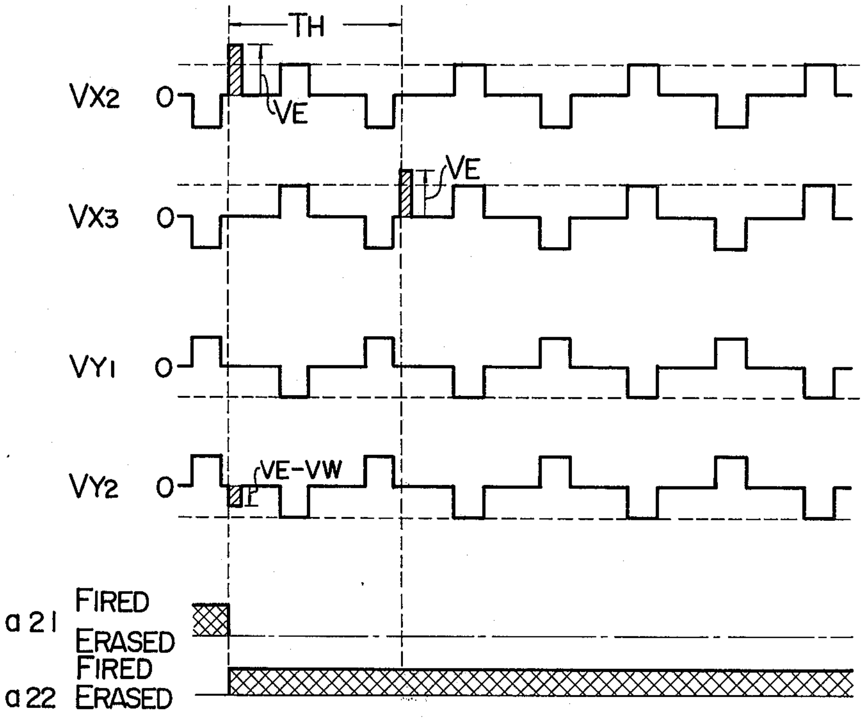

FIGS. 14 and 15 show the prior art method of addressing and the method of addressing according to the present invention when the trigger pulses shown in FIGS. 13*a* and 13*b* are used respectively for line sequential scanning by the driving system shown in FIG. 4. The plasma elements $a_{21}$ and $a$ 22 are shown changed from the fired to the erased state and from the erased to the fired state respectively.

It will be understood that the method shown in FIGS. 13*b* and 15 provides the same advantages as those described hereinbefore when it is applied to drive a matrix panel composed of plasma elements. That is, the addressing time can be reduced to about one-half of the period priorly required, the structure of the trigger circuit can be greatly simplified, and an undesirable reduction in the operating margin due to errors in the trigger pulse voltage value can be substantially eliminated.

FIGS. 14 and 15 illustrate the case in which the elements are addressed (in each period of the pulses supplied from the holding power supplies. However, it is actually possible to attain addressing in each half period of such pulses. In this latter case, $T_H$ in FIG. 15 illustrating the method of the present invention can be reduced to the half period whereas $T_H$ in FIG. 14 illustrating the prior art method is equal to one period.

Figure 16:
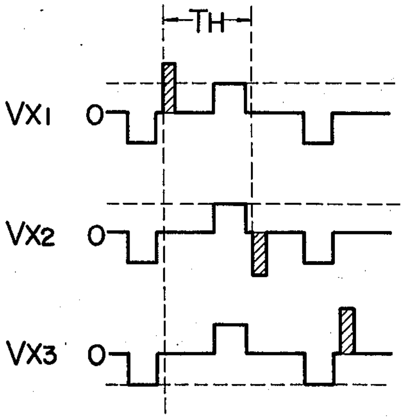
FIG. 16 shows another manner of applying trigger pulses according to the present invention.

FIG. 16 shows trigger pulses waveforms $V_{X1}$, $V_{X2}$ and $V_{X3}$ applied to the respective lateral electrodes $X_1$, $X_2$ and $X_3$ for addressing plasma elements every half period according to the present invention. One period in a plasma display panel is commonly of the order of 20 $\mu$sec. Therefore, the period of time required for each addressing is about 10 $\mu$sec. in the present invention, whereas that in the prior art method is about 20 $\mu$sec. In the standard television system, one horizontal scanning period is 63.5 $\mu$sec. Thus, when a televised picture is displayed on a matrix panel composed of plasma elements, intermediate tone of the order of $2^{(63.5/20)} \approx 8$ grades can only be displayed according to the prior art method. In contrast, according to the present invention intermediate tone of the order of $2^{(63.5/10)} \approx 64$ grades can be displayed and a picture of good quality can be reproduced.

Figures 17A, 17B, 17C:
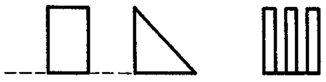
FIGS. 17*a* to 17*c* show other waveforms of trigger pulses used in the present invention.

While a trigger pulse waveform of rectangular shape has been illustrated by way of example, any other waveforms may be employed in the present invention. For example, waveforms as shown in FIGS. 17*a* to 17*c* may be employed in lieu of the rectangular waveform. Further, although the firing pulse and erasing pulse having the same pulse width have been illustrated, it is needless to say that they may have pulse widths different from each other. Any desired pulse waveform may be employed in the present invention inasmuch as the addressed photo element can be placed in either the erased state or the fired state by selective application of trigger pulse signals of different kinds to the lateral and longitudinal lines.

We claim:

1. A method for the line sequential driving of a matrix panel composed of a plurality of first and second electrodes intersecting one another, and a plurality of photo elements having an information storing function connected to the individual intersections of said first and second electrodes, comprising the steps of:

a. applying a first pulse to each of addressed ones of said first electrodes, said application of said first pulse maintaining each of the photoelements addressed by said first electrode applied with said first pulse in the state before being addressed; and b. applying a second pulse to one of said second electrodes in synchronims with said application of said first pulse, said synchronous application of said first and second pulses placing a photo element connected to said first and second electrodes respectively applied with said first and second pulses in the fired state, the application of said second pulse alone placing a photo element connected to said second electrode applied with said second pulse in the erased state.

2. A method for the line sequential driving of a matrix panel according to claim 1, wherein at least one of said first and second pulses which is superposed on a holding voltage is applied, and the application of said holding voltage alone maintains a photo element in the state before being addressed.

3. A method for the line sequential driving of a matrix panel composed of a plurality of first and second electrodes intersecting one another, and a plurality of photo elements having an information storing function connected to the individual intersections of said first and second electrodes, comprising the steps of:

a. applying a first pulse to each of addressed ones of said first electrodes, said application of said first pulse maintaining each of the photo elements addressed by said first electrode applied with said first pulse in the state before being addressed; and b. applying a second pulse to one of said second electrodes in synchromism with said application of said first pulse, said synchronous application of said first and second pulses placing a photo element connected to said first and second electrodes respectively applied with said first and second pulses in the erased state, the application of said second pulse alone placing a photo element connected to said second electrode applied with said second pulse in the fired state.

4. A method for the line sequential driving of a matrix panel according to claim 3, wherein at least one of said first and second pulses which is superposed on a holding voltage is applied, and the application of said holding voltage alone maintains a photo element in the state before being addressed.

5. A method for the line sequential driving of a matrix panel composed of a plurality of first and second electrodes intersecting one another, and a plurality of photo elements, having an information storing function, connected to the individual intersections of said first and second electrodes, comprising the steps of:

a. applying a first pulse to each of addressed ones of said first electrodes, said first pulse having a magnitude sufficient to maintain each of the thus addressed photo elements connected thereto in their respective states prior to being addressed; and b. applying a second pulse to a selected one of said second electrodes in synchronism with the application of said first pulse in step (a), said second pulse having a magnitude sufficient to both — (i) place a photo element connected to said first and second electrodes in the fired state upon the synchronous application of said first and second pulses, to said first and second electrodes, respectively, and (ii) place a photo element connected to said first and second electrodes in the erased state upon the application of only said second pulse to said second electrode.

6. A method for the line sequential driving of a matrix panel according to claim 5, wherein at least one of said steps (a) and (b) includes the step of superimposing at least one of said pulses on a holding voltage, the magnitude of which holding voltage is sufficient to maintain a photo element in its state prior to being addressed.

7. A method for the line sequential driving of a matrix panel according to claim 5, wherein each of said steps (a) and (b) includes the step of superimposing said pulses on a holding voltage, the magnitude of which holding voltage is sufficient to maintain a photo element in its state prior to being addressed.

8. A method for the line sequential driving of a matrix panel composed of a plurality of first and second electrodes intersecting one another, and a plurality of photo elements, having an information storing function, connected to the individual intersections of said first and second electrodes, comprising the steps of:

a. applying a first pulse to each of addressed ones of said first electrodes, said first pulse having a magnitude sufficient to maintain each of the thus addressed photo elements connected thereto in their respective states prior to being addressed; and b. applying a second pulse to a selected one of said second electrodes in synchronism with the application of said first pulse in step (a), said second pulse having a magnitude sufficient to both — (i) place a photo element connected to said first and second electrodes in the erased state upon the synchronous application of said first and second pulses to said first and second electrodes, respectively, and (ii) place a photo element connected to said first and second electrodes in the fired state upon the application of only said second pulse to said second electrode.

9. A method for the line sequential driving of a matrix panel according to claim 8, wherein at least one of steps (a) and (b) includes the step of superimposing at least one of said pulses on a holding voltage the magnitude of which holding voltage is sufficient to maintain a photo element in its state prior to being addressed.

10. A method for the line sequential driving of a matrix panel according to claim 8, wherein each of steps (a) and (b) includes the step of superimposing said pulses on a holding voltage, the magnitude of which holding voltage is sufficient to maintain a photo element in its state prior to being addressed.

* * * * *